(12) United States Patent
Garbaty et al.

(10) Patent No.: US 6,905,597 B2
(45) Date of Patent: Jun. 14, 2005

(54) DEVICE FOR RECOVERING OIL FROM AN OIL-SLICK ON A STRETCH OF WATER

(76) Inventors: Rudolf Franz Garbaty, deceased, late of Norderstedt (DE); by Helga Garbaty, legal representative, Hans-Slb-Str. 81, 22851 Norderstedt (DE); by Stefan Garbaty, legal representative, Löwenstrasse 53, 20251 Hamburg (DE); by Thomas Garbaty, legal representative, Im Rüschen 3, 32584 Löhne (DE); by Harriet Garbaty, legal representative, Rutschbahn 40, 20146 Hamburg (DE)

(*) Notice: Subject to any disclaimer, the term of this patent is extended or adjusted under 35 U.S.C. 154(b) by 53 days.

(21) Appl. No.: 10/296,597
(22) PCT Filed: May 23, 2001
(86) PCT No.: PCT/EP01/05944
§ 371 (c)(1),
(2), (4) Date: Jun. 2, 2003
(87) PCT Pub. No.: WO01/90486
PCT Pub. Date: Nov. 29, 2001

(65) Prior Publication Data
US 2004/0099591 A1 May 27, 2004

(30) Foreign Application Priority Data
May 26, 2000 (DE) .......................................... 100 26 229

(51) Int. Cl.[7] .............................................. E02B 15/04
(52) U.S. Cl. ..................................... 210/242.3; 210/923
(58) Field of Search ............................. 210/122, 242.1, 210/242.3, 540, 923, 776

(56) References Cited

U.S. PATENT DOCUMENTS

| 3,675,771 A | * | 7/1972 | McKee ..................... 210/242.3 |
| 3,700,108 A | | 10/1972 | Richards ..................... 210/242 |
| 3,708,070 A | * | 1/1973 | Bell ........................ 210/242.3 |
| 3,822,789 A | | 7/1974 | Crisafulli ..................... 210/242 |
| 3,823,828 A | * | 7/1974 | Derzhavets et al. ..... 210/242.3 |
| 3,860,519 A | * | 1/1975 | Weatherford ............ 210/242.3 |
| 3,951,810 A | | 4/1976 | Crisafulli ................ 210/242 S |
| 3,966,615 A | * | 6/1976 | Petchul et al. ........... 210/242.1 |
| 4,257,889 A | | 3/1981 | Wober et al. .............. 210/104 |
| 4,487,694 A | | 12/1984 | Brandt et al. ............. 210/242.3 |
| 4,851,133 A | * | 7/1989 | Rymal ......................... 210/923 |
| 5,215,654 A | * | 6/1993 | Karterman .................. 210/122 |
| 5,409,607 A | * | 4/1995 | Karlberg .................. 210/242.3 |

FOREIGN PATENT DOCUMENTS

| DE | 4233526 A1 | 4/1994 |
| FR | 2425975 | 12/1979 |
| GB | 1522803 | 8/1978 |
| GB | 1533814 | 11/1998 |
| WO | WO 92/03383 | * 3/1992 |

OTHER PUBLICATIONS

R. Klimek & G. Clauss, "Development of an oil skimming and separating system to combat oil spills at sea", pp 9–15, Feb. 1983.
One page English Abstract from esp@cenet for DE–4233526–A1, Apr. 1994.
One page English Abstract from Derwent for FR–2425975, Dec. 1979.

* cited by examiner

Primary Examiner—Christopher Upton
(74) Attorney, Agent, or Firm—Howson and Howson

(57) ABSTRACT

A device for recovering oil from an oil-slick on a stretch of water is supported on the water by at least one first floating body and is provided with an inlet that is open facing the oil-slick and that flows into a channel with side walls. The channel is provided with at least one separating body that extends between the side walls in such a manner that an upper drain zone is formed above the separating body and a separate lower drain zone is formed below the separating body. The front edge of the separating body facing the oil-slick is substantially disposed on the level of the water/oil interface and the oil can be discharged from the upper drain zone. The device makes use of the natural interface between the oil-slick and the subjacent water.

23 Claims, 11 Drawing Sheets

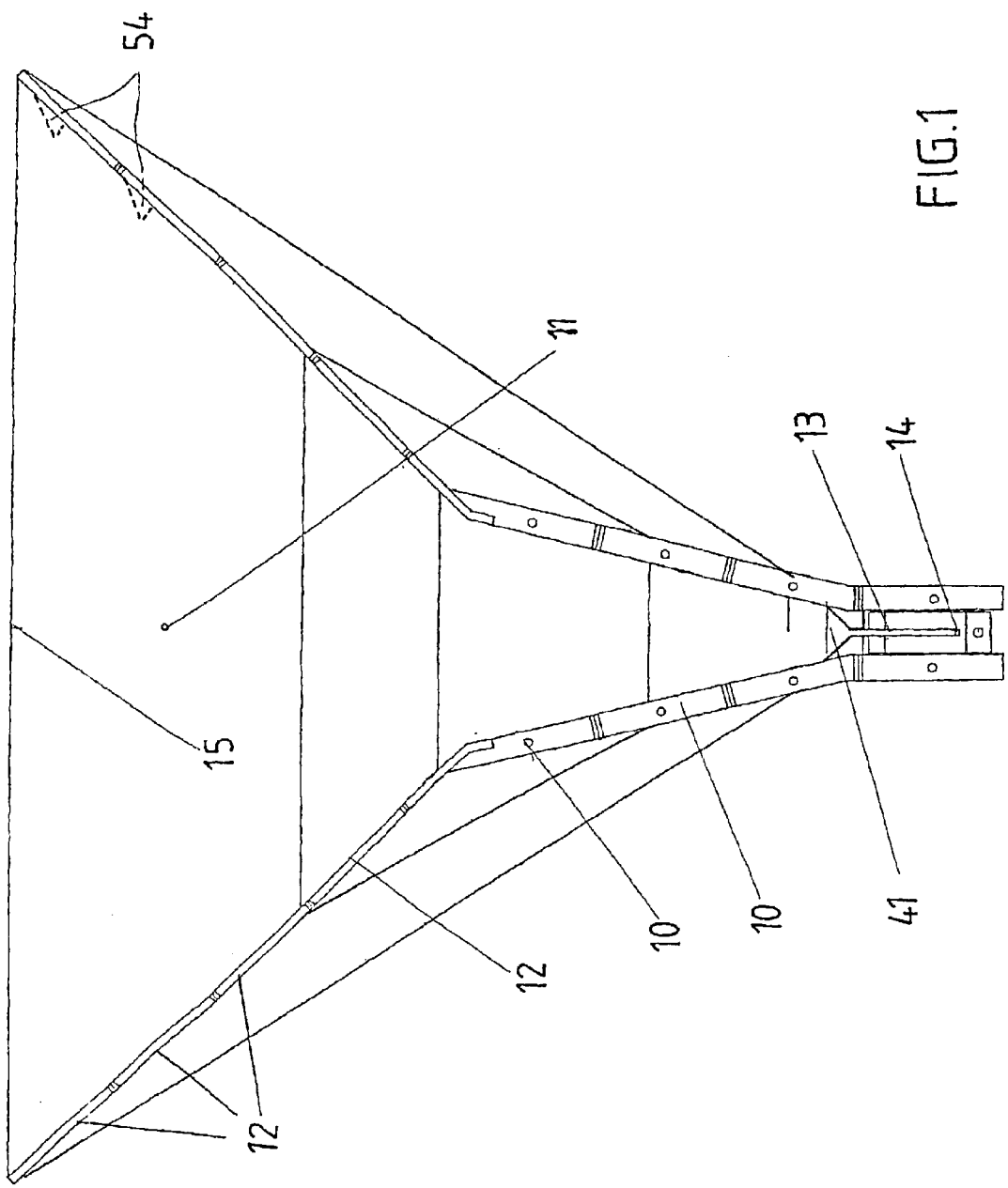

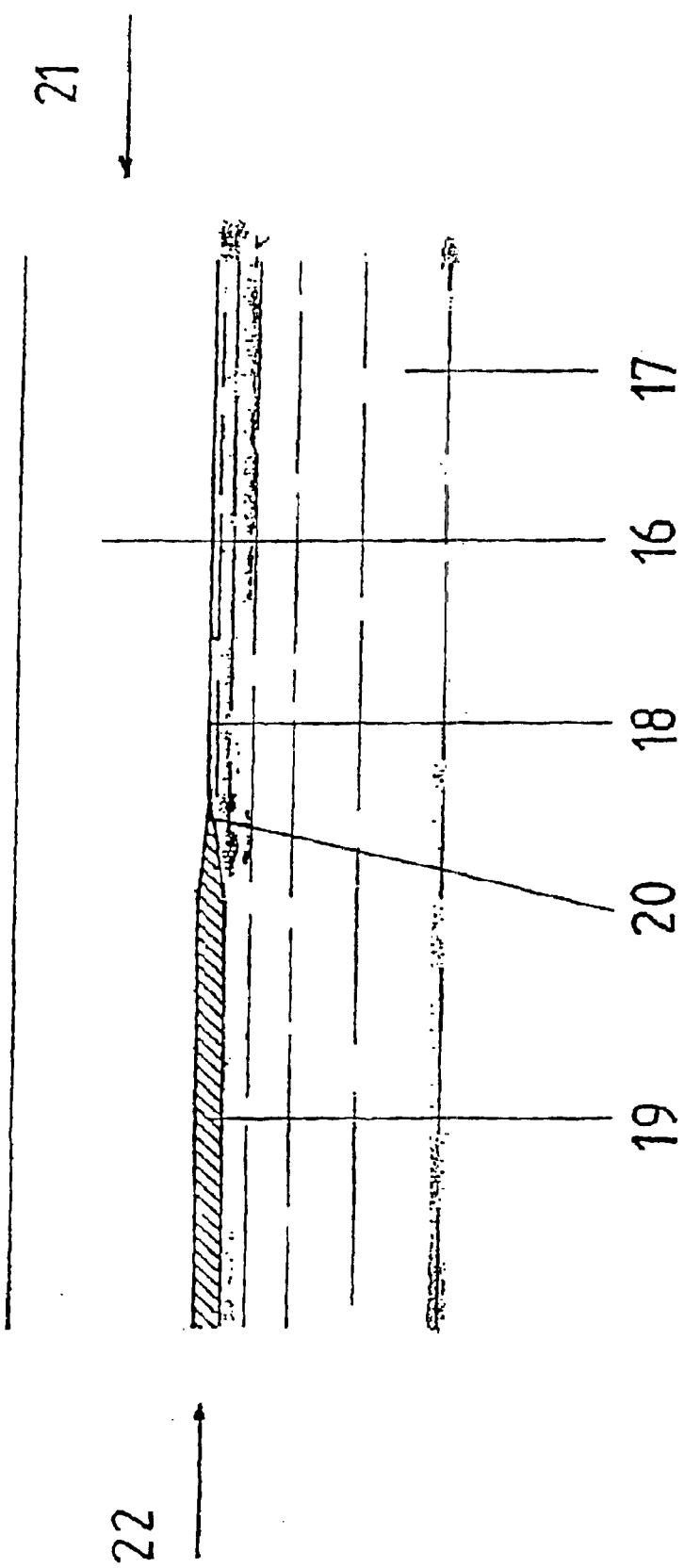

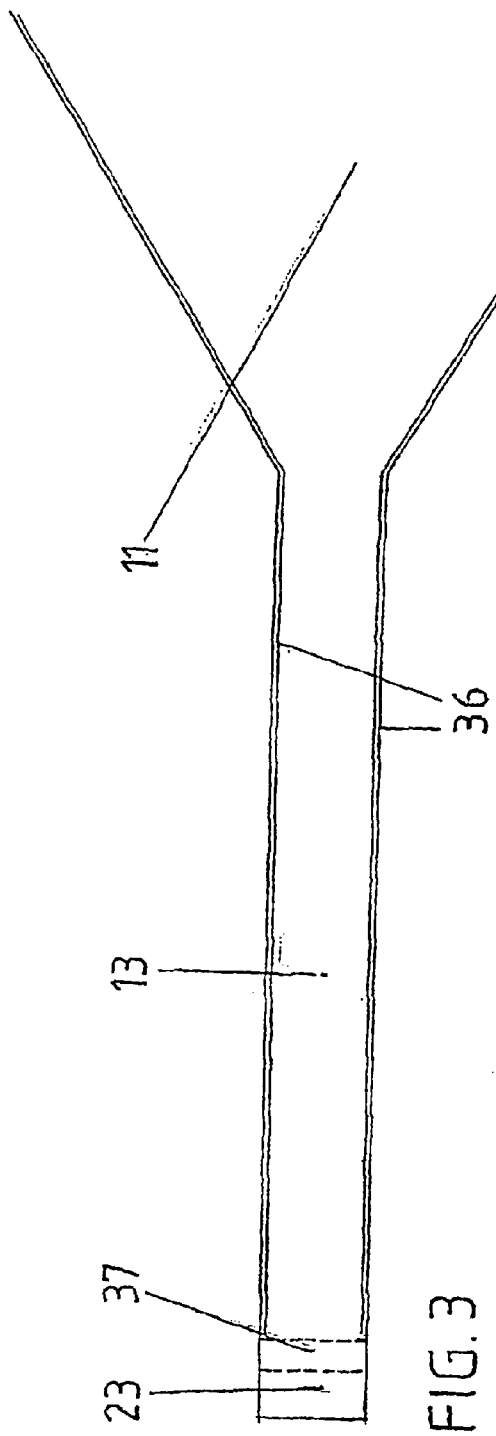
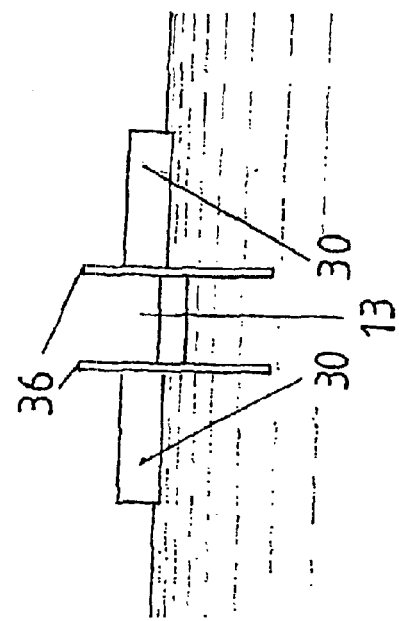
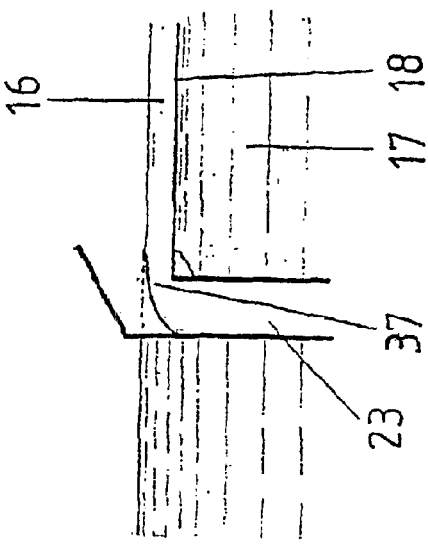

DEVICE FOR RECOVERING OIL FROM AN OIL-SLICK ON A STRETCH OF WATER

BACKGROUND OF THE INVENTION

The invention relates to a device for recovering oil of an oil slick on a body of water, whereby the device is supported on the water by at least one first floating body having an outlet that is open on one side in the direction of the oil slick and that discharges, on the other side, into a channel with sidewalls.

It is generally known that oil accidents at sea lead to great environmental catastrophes. In particular, if the accident occurs in the vicinity of a coast, soiling of a large to very large coastal strip with oil cannot be avoided. The consequence is destruction of the flora and fauna in this area for an unforeseeable time. Something similar is true for oil accidents on the high seas, but such environmental catastrophes do not have as direct a visible effect.

It is basically known that the oil which is flowing out forms an oil slick on the body of water. Such an oil slick spreads further and further. This occurs because of the oil quantity which frequently follows and because of the constant lowering of the level on the oil slick boundaries, wherein the oil slick becomes thinner and thinner. Various efforts to fight such an oil slick are known. Frequently, chemical agents which emulsify the oil are used, so that it sinks and can apparently no longer be seen. Nevertheless, the oil is present, as before, in the water.

The suctioning off of the oil from the oil slick by means of suctioning devices is also known. With known systems, however, a large fraction of water is always suctioned in also, which, in part, leads to a large liquid quantity which can no longer be controlled. In particular, the separators which can be obtained at the time are not able to separate sufficiently the oil from the water which is also suctioned in the short time available.

SUMMARY OF THE INVENTION

The goal of the invention is to propose a device to recover oil from an oil slick, in which the natural separation of the oil from the water is utilized.

The goal is attained in accordance with the invention in that at least one separating body is provided in a channel into which an inlet discharges; it extends between the sidewalls of the oil channel in such a way that an upper drain zone is formed above the separating body and a lower drain zone, separated from it, below the separating body, wherein the front edge of the separating body, facing the oil slick, is essentially oriented toward the level of the separating layer between the water and the oil, and the oil can be removed from the upper drain zone. The invention hereby utilizes the natural existing separating layer between the oil slick, on the one hand, and the water which is located underneath, on the other hand. Investigations have shown that this separating layer between the water and oil is relatively stable, but is sensitive with respect to quick and jerky movements. For this reason, the previously known suctioning methods have not led to success.

With the device in accordance with the invention, the oil flowing into the outlet is almost spontaneously separated from the water. The separating body is thereby constructed in such a way that it does not hinder the flow. By the removal of the oil from the upper drain zone at a distance from the separating edge of the separating body in the upper drain zone, a suction is formed, which leads to more and more oil of the oil slick being drawn into the inlet, without, however, forming local suction parts. At a sufficiently far distance of the suction device from the front separating edge of the separating body, a destruction of the natural separating layer between the water and oil is avoided, so that this naturally occurring separation can be utilized.

With the device in accordance with the invention, therefore, the separating body must be oriented to the level of the separating layer between the water and the oil. Provision can be made so that the specific weight of the separating body is smaller than water and greater than oil and dimensioned so that it is oriented spontaneously to the level of the separating layer. Here, a physical property is utilized, namely that a body whose specific weight is lighter than a heavier liquid and is heavier than a lighter liquid will always level out at the level of the separating layer between these liquids. This is completely independent of the specific weights and heights and depths of the pertinent liquids. A separating body with these characteristics always remains at the level of the separating layer between the water and oil, with a sufficiently thick oil slick, independent of the layer thickness that the oil slick actually has.

A second floating body can also be provided, whose specific weight is lighter than water and is heavier than oil, and the position of this second floating body is used to monitor and/or to correct and/or to adjust the position of the separating body in the channel. Here too, use is made of the fact that the second floating body is always found at the level of the separating layer and thus can deliver an adjustment signal for motor-driven means to adjust the position of the separating body.

Provision can be made so that the second floating body and the separating body essentially have the same specific weight. The specific weight of the separating body can be, for example, 850–950, especially 900 kg/m³. A selected specific weight of 900 kg/m³ leads to a situation where, with many accidental oil spills, the separating body is located nearly in the middle, at the level of the separating level between the water and the oil. The separating body can be made of polypropylene, whose specific weight is 900 kg/m³. The use of such a plastic has, moreover, the advantage that it is not sensitive with respect to seawater, on the one hand, and oil, on the other hand.

To create a sufficient suction which leads to the oil slick flowing into the inlet, it is necessary for the oil above the separating body to be continuously or at least almost continuously removed. Provision can be made so that the upper drain is connected with an active suction device, which suctions off the oil. Here, however, a problem may be found in that a swirling is created by the suction device, even when the separating edge is placed at a distance, which destroys the separating layer between water and oil, which is sensitive in that respect.

In accordance with a particularly preferred embodiment of the invention, therefore, provision is made so that the suction device comprises a dropping gradient, which is formed by a submergible shaft whose upper edge is connected with the separating body. By means of such a measure, a flow is created which is constantly measured according to the quantity of subsequently flowing oil that is present. With a greater oil quantity, more oil is separated and drops into the submergible shaft. A greater suction is created, which leads to an increased wake of the oil slick. With a smaller quantity of oil, for example, with a smaller thickness of the oil slick, a correspondingly smaller suction is established. Any subsequent regulating of the suction pumps or the like is not necessary. One does not have to fear either that too much water is removed with the oil, since due to the separating body explained above, only oil is found above the separating body.

For the removal of the oil falling into the shaft, a pump can be provided, which pumps off the oil flowing into the shaft into a suitable container. This pump is located at a sufficient distance from the separating layer and moreover, pumps only remove oil also, so that one does not have to worry about the separating layer being destroyed by this pump.

The separating body can be connected, for example, via an elastic element with the shaft for the dropping gradient. It is expedient if the separating body is constructed as an essentially flat plate, which extends essentially horizontally between the sidewalls of the channel. In this way, a dividing of the channel is effected at the level of the separating layer between the water and the oil. The flat plate does not impede the flow, but rather merely divides it, so that good separating results with a high throughput can be attained.

It may be expedient if the separating body in a connecting link guide can move vertically, back and forth, relative to the sidewalls of the channel. It is particularly expedient if the separating body is held against the flow. This makes it possible for the separating body to be oriented, essentially horizontal and parallel with respect to the separating layer between the water and the oil. Thus, the danger is avoided that the separating body is deflected by larger floating parts and moves either completely above the oil slick or under the water.

It is expedient if the front separating edge of the separating body, facing the oil slick, is oriented in such a manner that it moves slightly below the separating layer between the oil and the water. This makes it possible for the oil slick to be removed completely. The water which is slightly removed also represents only a small weight fraction, which can be neglected. It is important that the sea behind the device is then essentially free of the oil of the oil slick.

In accordance with a more developed embodiment of the invention, provision is made so that the first floating bodies support the device in such a way that the device essentially follows the large swell. It is obvious that the effectiveness of the separation between the oil and the water depends, in particular, on as accurate as possible an orienting of the separating body along the separating layer between the water and the oil. It is therefore necessary for the device to be able to follow the swell, so as to be able to bring the separating body into the area of the separating layer at all. Too heavy a device would result in it not being able to follow the swell any longer and the oil slick could slosh way over the device. It is therefore necessary for the device to be constructed, as a whole, relatively light so that it can follow a large swell. For an effective mode of operation in the area of the inlet, the device can have a span of at least 30–50 m, preferably, however, 50–100 or 200 m and more. The device can also be combined with traditional oil booms.

It is obvious that the device can follow a large swell with the appropriate construction of the first floating bodies. Smaller waves, however, are superimposed on this large swell, which it is necessary to compensate for also. Therefore, provision is also made for the channel to be supported on the water by at least a third floating body and to be kept movable relative to the inlet. The third floating bodies are to be dimensioned in such a way that the channel can follow the superimposed swell. It is obvious that with this separate design of the oil channel, on the one hand, and the inlet, on the other hand, the separating body can be brought first, with great reliability, into the area of the level of the separating layer between the water and the oil. The selection of the specific weight of the separating body makes it possible for the separating body to be oriented exactly to the separating layer, independent of the layer thickness of the oil slick. Finally, this leads to a situation where the device can also be used with a medium and heavy swell, as long as the device can follow the swell. The separating result is not influenced or only insubstantially influenced by this.

For a satisfactory functioning of the device, it is advantageous if the separating layer between the water and the oil can be conducted to the dropping gradient as undisturbed as possible. Built-in parts in the area of the inlet are a hindrance to this. In a more developed embodiment of the invention, therefore, provision is made so that the inlet is formed from floating boundary bodies, which are kept in the opened position by a cable bracing. This cable bracing can run above the oil slick so that one need not worry that it can be influenced.

Furthermore, it may be expedient if the boundary bodies are movable with respect to one another. This makes it possible for the two, in part, very long booms, which form the funnel-shaped inlet, to be brought in line with the swell and a slamming of the boundary bodies on the oil slick or an immersion can be avoided. The device thus behaves like the oil slick, and a destruction of the separating layer between the oil and the water, which is important for the drawing off of the oil, is avoided.

The oil slick, as such, is not influenced only by the swell, however. Rather, the wind also plays a great role, which can lead to a more or less pronounced churning up of the oil slick. In order to plan the separation essentially insensitive with respect to the wind, provision is made so that at least the channel is closed off above by at least one cover. This has the advantage that the wind can no longer act on the oil slick.

Furthermore, fourth floating bodies can be provided, which float on the oil slick and are connected in a wind-tight manner with the cover and close at least one part of the inlet and/or the mouth of the channel above the oil slick. This prevents the wind from blowing into the channel. An even better calming of the oil slick is attained just before the dropping gradient in this way, so that the separating result can be improved even more. It is expedient hereby if the fourth floating bodies are connected with the cover elastically via at least one expansion bellows. In this way, the swell between the fourth floating body, on the one hand, and the cover, on the other hand, can be evened out.

Basically, it will be required that the device be oriented toward the oil slick. However, it is obvious that any drive will bring about a destruction of the oil slick or the separating layer between the oil and the water. In order to avoid this, provision is made, in accordance with the invention, so that the device is provided with a drive on the side of the channel turned away from the inlet. The drive can, moreover, be placed far below the separating layer, so that one does not have to worry about destruction of the separating layer between the oil and the water. The drive is used to orient, maintain the position, and move forward the device at relatively low speeds. The drive can be dimensioned correspondingly small.

Furthermore, at least one additional drive can preferably be provided at the end of the booms, which form the inlet. This drive can be placed below the separating layer and makes possible a turning of the device. In this way, the separating layer is not destroyed.

It should be noted that the device, especially because of the relatively light structure, will not be able to cover great distances on the sea independently. Nor is a greater speed, which is in part required to reach the oil slick in a speedy manner, possible. In accordance with the invention, therefore, provision is also made so that the device can be broken down into parts, which advantageously fit into the ISO modular dimensions of Euro containers. This makes it possible for the broken-down device to be brought to the oil slick quickly, using a corresponding transport ship. In particularly urgent cases, this can be done with a helicopter. The assembly at the site can be carried out quickly so that a timely recovery of the oil is possible.

It is obvious that to a large extent, only the oil is drawn off from the water by the device, in accordance with the invention, without an excessively large quantity of ballast water being carried along. Nevertheless, the conducted quantity of oil must be stored and transported away, separately from the water. In the case of an accident of a normal transport ship, in which only the fuel runs out, the quantity of the recovered oil can be controlled. With an accident of an oil tanker, on the other hand, problems can appear with the storage and transporting off of the recovered oil. An empty tanker in the same size as the ship which had the accident, will, as a rule, not be available or not be available within a short time. The oil must therefore be transported off continuously, more or less, by smaller ships. Thus, there is a loss of time, which results in a growing oil slick, whose recovery is basically difficult.

In accordance with the invention, therefore, provision is made so that the separated oil is pumped by at least one pump, at least partially, into the first floating bodies. These floating bodies are basically designed hollow and can provide intermediate storage for a relatively large quantity of oil, until a corresponding transport ship is available.

It may also be appropriate, however, if the separated oil is pumped by at least one pump, at least partially, into the boundary bodies of the inlet. These boundary bodies are also designed hollow and can take up a certain quantity of oil. However, with these two measures, one should note that in this way the entire device becomes heavier, so that under certain circumstances, the swell can no longer be readily followed.

In accordance with a preferred embodiment of the invention, provision is therefore made so that the separated oil is, at least partially, pumped by a pump in containers which float independently of the device and are elastically connected with it. These containers can, for example, be designed as folding containers and can be closed completely. The filled containers are collected and for example, bound to one another and later can be either recovered completely from the water or pumped empty as soon as a corresponding transport ship has arrived at the oil slick. The problem of transporting off only by smaller ships can be solved by the possibility of such an intermediate storage.

BRIEF DESCRIPTION OF THE DRAWINGS

The invention is explained in more detail in the following with the aid of the schematic drawing. The figures show the following:

FIG. 1, the top view of a device in accordance with the invention;

FIG. 2, in sectional view, an oil slick;

FIG. 3, the mouth area of the inlet into the channel;

FIG. 4, in section, the dropping gradient;

FIG. 5, the back view of the channel, in accordance with FIG. 2;

DESCRIPTION OF THE PREFERRED EMBODIMENTS

Figure 6:
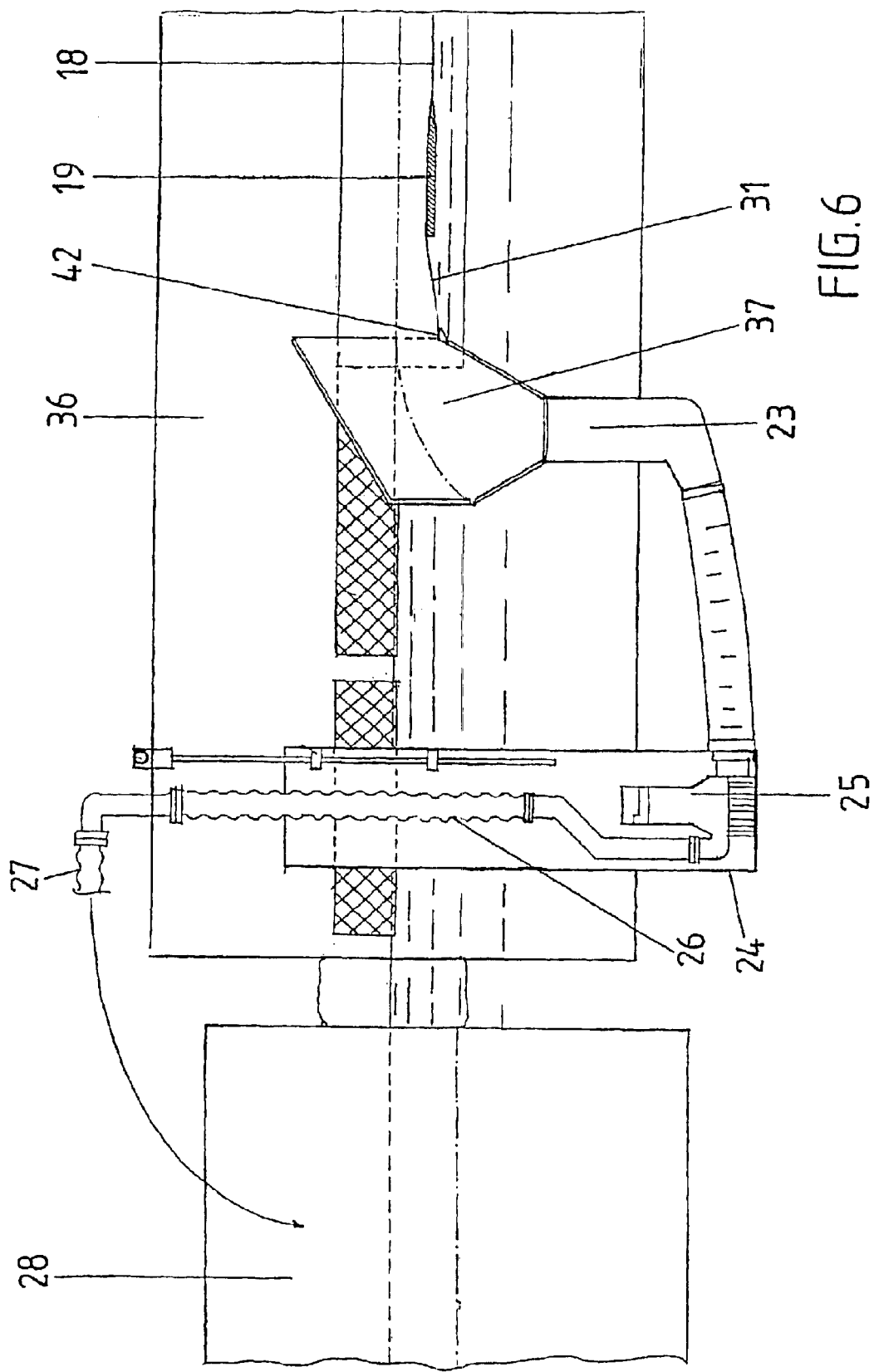
FIG. 6, the dropping gradient with the suction device in enlarged representation form in a side view.

The device for the recovery of oil, represented in the drawing, has an inlet 11, which is formed by lateral floating boundary bodies 12. The inlet 11 discharges into a channel 13 on whose end 14, at least one removal device for the separated oil is provided. The channel 13 has sidewalls 36, which are immersed vertically in the body of water and thus laterally limit the flow for the oil slick and the water found underneath. This part of the device is conducted and held by first floating bodies 10 with a vertical relative movement possibility.

As can be seen, in particular from FIG. 1, the entire device essentially consists of floating bodies 10, 12, connected with one another, which are preferably affixed in a way so that they can move with respect to one another. In order to keep the inlet in the depicted, stretched position, bracing cables 15 are provided, which extend above the oil slick and the entire device is kept under tension in the desired form, represented in FIG. 1.

The depicted device makes it possible for the oil of an oil slick to be separated, in a simple manner, from the water found underneath. The fact that a relatively stable separating layer forms between water and oil, which is merely sensitive to rapid movements, such as swirlings, is hereby utilized. The principle is schematically shown in FIG. 2. An oil slick 16 is present, which floats on the water 17 of a body of water of any type. The reason for this is that the oil, as a rule, has a lower specific weight than water. If a separating body 19 is provided, whose front boundary edge 20 is oriented to the level of the separating layer 18, a flow in the direction of the arrow 21 or a movement of the separating body 19 in the direction of the arrow 22 would bring about a separation of the oil slick 16 from the water 17. A movement of the separating body 19, however, has the disadvantage that the separating layer, which is relatively sensitive with respect to such movements, would be destroyed. A clean separation of oil and water would eventually no longer be possible. If, on the other hand, the oil slick itself moves in the direction of the edge 20, then a destruction of the separating layer does not occur. The device utilizes this knowledge to the effect that at the end of the channel 13, the oil is always drawn off, so that a suction arises, which makes the oil slick move itself in the direction of the separating edge 20 of the separating body 19. The only thing which is required is for the separating body 19 to always be kept at the level of the separating layer 18.

FIG. 4 shows a possible embodiment of the creation of a suction in a so-called dropping gradient 37. A shaft 23 is provided which follows the separating body 19. The oil 16 flowing off over the separating body 19 falls into the shaft and thus produces a suction, which draws the subsequent oil. Since the device is essentially completely in the oil slick, enough oil is always present, which can flow subsequently. The floating oil of the oil slick is thus completely separated and flows spontaneously into the shaft. The only thing which is required is for the flowing oil to be removed from the shaft, so that a backing up does not arise.

Figure 7:
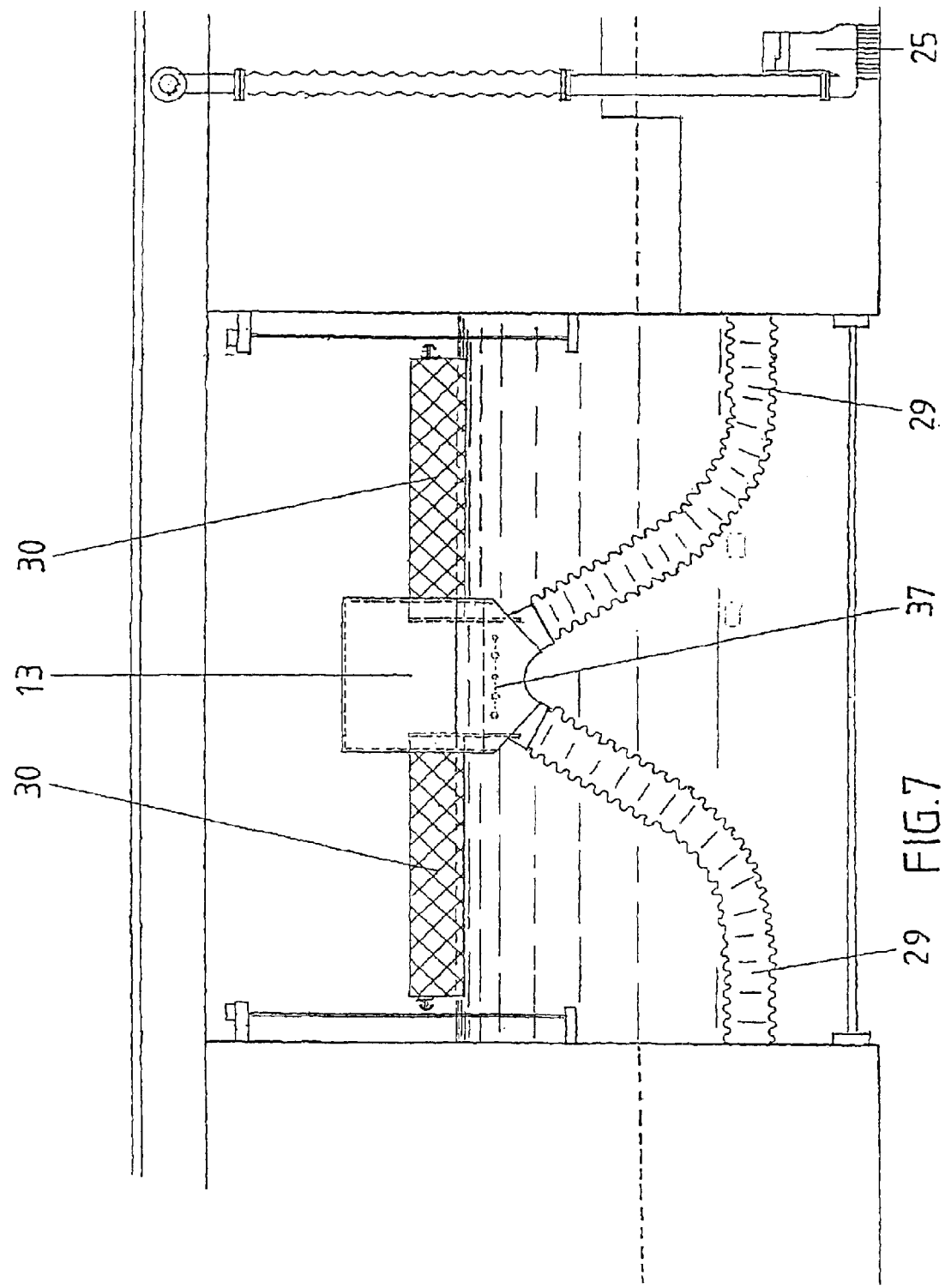
FIG. 7, the back view of the dropping gradient in an enlarged representation form.
Figure 8:
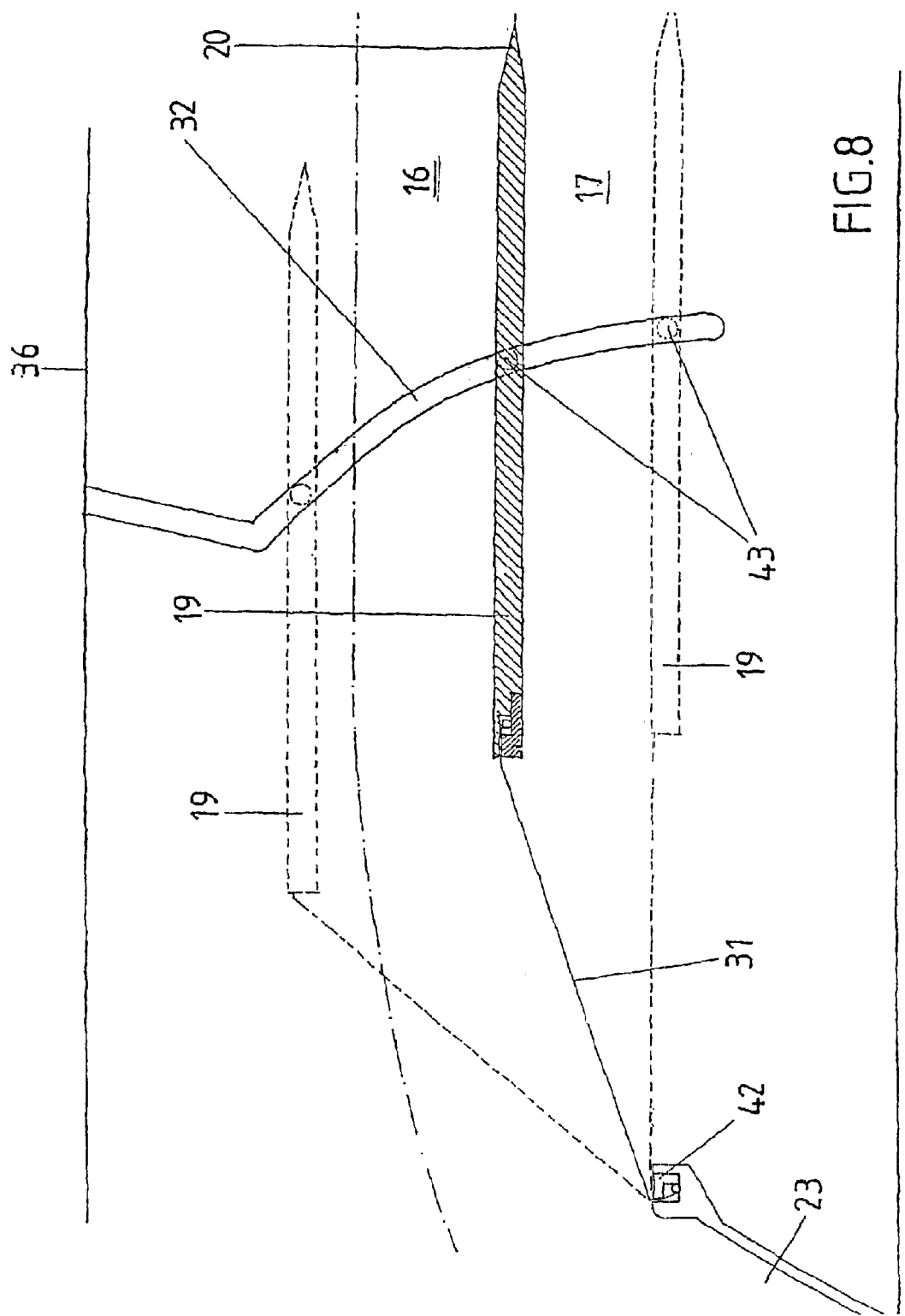
FIG. 8, the side view of the separating body in accordance with the invention.

FIGS. 6 and 7 show, schematically, the entire removal device for the oil drawn off by the dropping gradient. One can see the separating body 19, which is oriented along the separating layer 18 between the water and the oil. The oil dropping into the shaft 23 enters a container 24, in which at least one submergible pump 25 is located. This submergible pump conveys the oil, via preferably elastic conduits 26, 27, into containers 28, which are not depicted in more detail. These containers 28 can be, for example, the cavities of the boundary bodies 12 or the floating bodies 10. Provision can also be made, however, so that the containers 28 float on the sea, completely separate from the device behind it, and after filling, are completely closed and collected, separate from the device.

It is not absolutely necessary for the shaft 23 to be made of a rigid structure. As can be seen in FIG. 7, provision can also be made so that the shaft is formed by elastic hoses 29, which extend below the level of the separating shaft, so that the required dropping gradient is produced. In this way, an effective separation of the oil from the water can be brought about, as long as the separating body 19 is kept at the level of the separating line 18 with sufficient precision.

In order to attain as precise as possible an orientation of the separating body 19 to the level of the separating layer 18, provision is made, first of all, so that the floating bodies 10, 12 are so designed and dimensioned that the entire device can follow a large swell. The movable connection of the individual floating bodies 10, 12, among one another, makes it possible moreover for the entire device to adapt elastically to the swell. Therefore, this prevents individual parts of the device from slamming on the slick or from being overflowed by it, wherein a destruction of the sensitive separating layer could begin. Furthermore, provision is made so that the channel 13 is supported by separate third floating bodies 30, and independent of the movement, the device is supported on the floating bodies. This makes it possible for the channel to remain movable vertically, relative to the entire device, and to be able to follow the small waves also, which are superimposed on the large swell. In this way, the channel is located in the area of the oil slick, independent of the entire device. The channel with the dropping gradient 37 is thus already in the area of the separating layer, so that the separating body 19 can also be supported at the level of the separating layer 18. The placement of the individual floating bodies is accordingly carried out in such a way that the channel is always located on the same wave crest or in the same wave trough as the first floating bodies 10 of the device.

For the precise orientation of the separating body 19 to the level of the separating layer 18, the separating body is made of a material whose specific weight is lighter than that of water and heavier than that of oil. In particular, the separating body 19 can be made of polypropylene, which has a specific weight of 900 kg/m$^3$. According to physical laws, the separating body 19 is then always located between the two layers 16, 17 and thus essentially exactly on the level of the separating layer 18. Such a separating body makes it possible for it to be oriented along the separating layer 18, spontaneously and independently of the individual layer thicknesses and independently of the relative position of the channel 13 with respect to the oil slick.

The separating body is preferably designed as a flat plate, which is conducted in an essentially horizontal position in the channel in such a manner that it can move up and down. This makes it possible for the oil slick to flow on the upper side of the separating body and the water to flow on the lower side, without a destruction of the separating line occurring. The thickness of the separating body is a measure of the immersion depth into the water and the height at which it penetrates the oil. A body which is as flat as possible and preferably tapers toward the front is therefore favorable. Nevertheless, the thickness must be selected so that the separating body remains sufficiently rigid. A thickness of 1.0–3.0 cm will be sufficient. Furthermore, the immersion depth can be selected by the specific weight. A separating body with a specific weight close to water is immersed deeper, whereas a lighter separating body projects more into the oil layer. It may be appropriate that the separating body immerses almost completely in the water, so that the floating oil does not undergo a deflection or deflects only insubstantially. The tapering can then be asymmetrical so that the separating body tapers toward the front, above. The sensitive separating line is thus hardly influenced.

The separating body 19 is preferably hinged to the shaft 23 via an elastic intermediate element 31. In this way, it is possible for the upper edge 42 of the shaft to always be connected with the upper area of the separating body 19, so that only oil can enter into the shaft. Furthermore, the separating body is designed flat, so that a large flow resistance is not created during the circulating flow. An almost complete separation is attained, since the separating body extends between the sidewalls 36 of the channel, and the flow can go off only above and below the separating body. No boundary is provided below the separating body behind the device, so that the water 17 can flow on unhindered. Above the separating body, the further flow is artificially produced by removal of the oil from the shaft of the dropping gradient. The flow, accordingly, continues unhindered, only in that the oil is peeled off from the water.

Furthermore, provision is made so that the separating body 19 is supported in a connecting link guide 32 on the channel via lateral projections 43. The connecting link guide makes it possible also for the separating body 19 to be maintained, relatively firmly, against the flow direction. The advantage to this is that the separating body 19 cannot straighten up.

Figure 9:
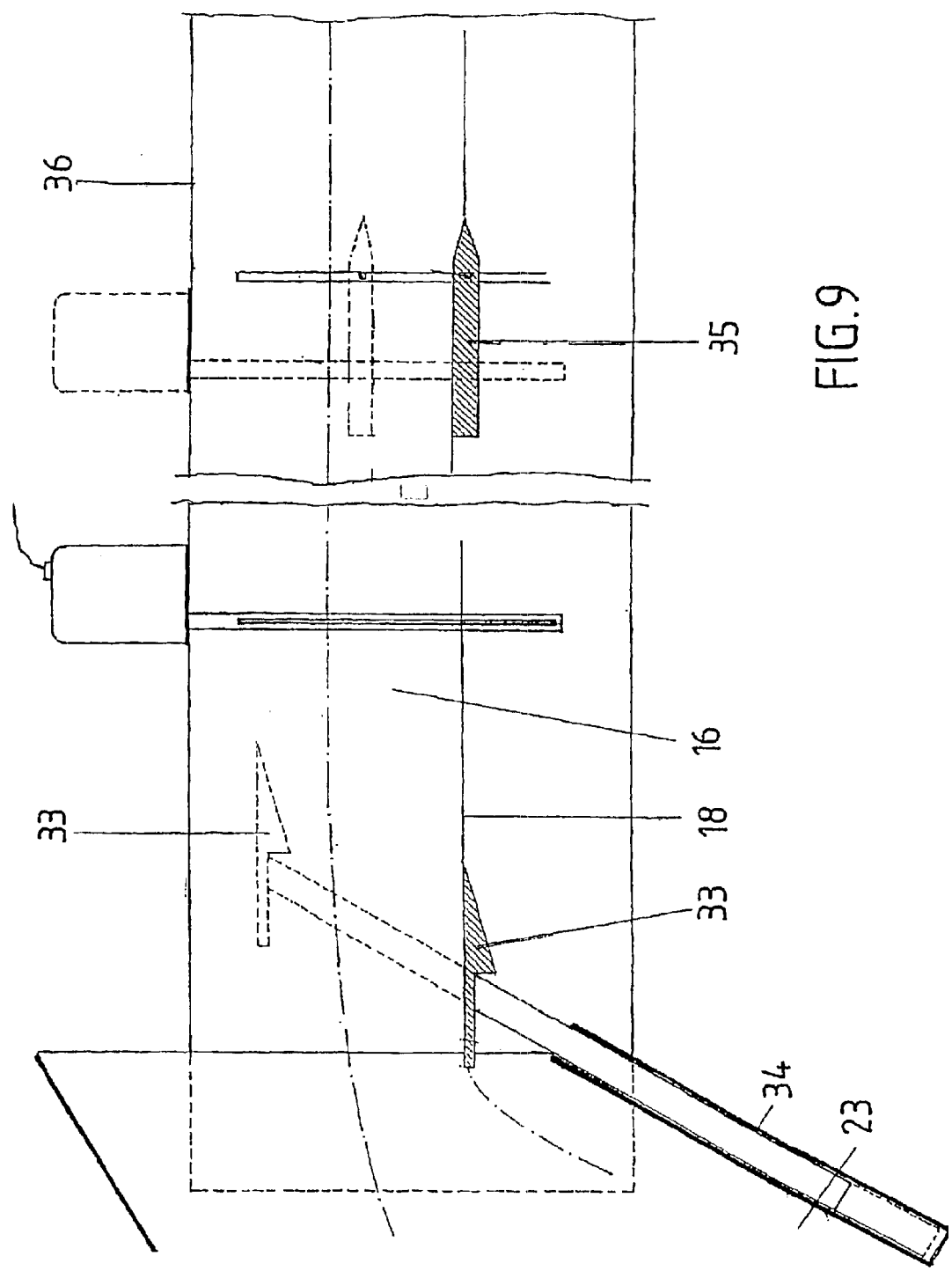
FIG. 9, the side view of the separating body in accordance with another embodiment of the invention.
Figure 10:
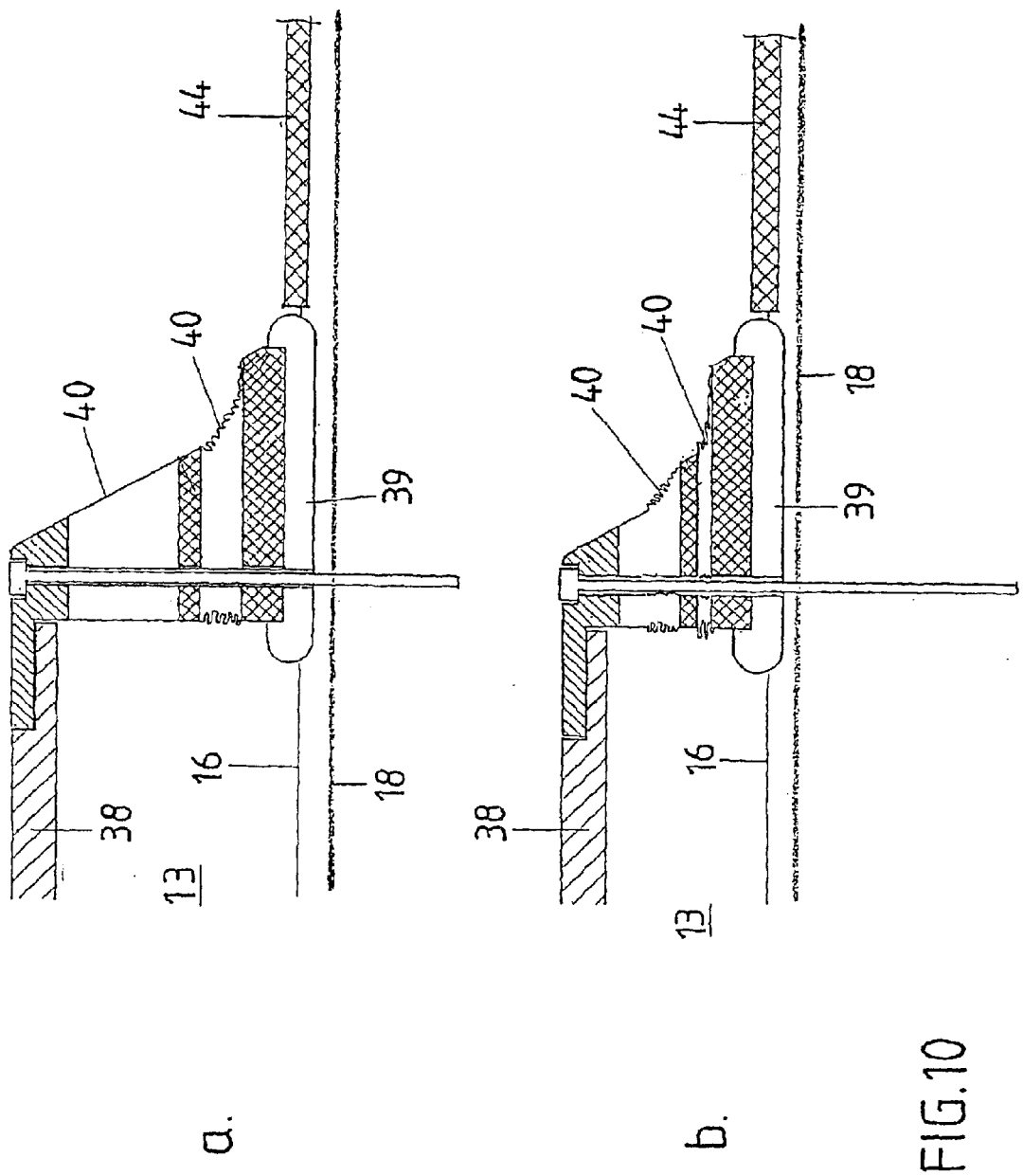
FIG. 10a, b, the side view of the fourth floating bodies for the sealing off of the wind in various floating positions.

FIG. 9 shows another type of orientation of a separating body 33. The separating body is held in a linear guide 34 in such a manner that it can move up and down. The movement can take place as a result of the selected specific weight of the separating body. Provision can also be made, however, so that the position of the separating body is adjusted by means of a motor. A second floating body 35 can be provided whose specific weight lies between that of water and oil. The second floating body is, accordingly, oriented toward the separating layer 18 and can deliver an adjustment signal for the motor-driven agent. For this purpose, this floating body 35 is located in the flow direction before the separating body. The separating body is thus actively supported at the level of the separating layer. In particular, it is hereby possible to adjust the separating body promptly to a new position of the separation layer, which is subject to continuous changes. The motor-driven agent can work electrically, hydraulically, or pneumatically. Provision can also be made so that such an independent second floating body 35 monitors and possibly readjusts the position of the separating body 33.

The selection of the specific weight of the separating body 19 also depends on the type of oil in the oil slick. Provision can be made so that the separation body 19 is supported in a detachable manner in the channel, so as to be able to assemble various separating bodies with different specific weights. Provision can also be made so that the separating body 19 can be equipped with corresponding weights, preferably beneath it, so as to increase its specific weight. It has been shown, however, that the use of a separating body 19 made of polypropylene will be sufficient for most cases.

The front separating edge 20 is designed relatively pointed in the exemplified embodiment shown in the drawing. Thus, a separation of the layers lying over one another can be effected without swirl. It is advantageous if this front separating edge 20 is oriented somewhat below the separating layer 18, so as to make possible a complete separation of the oil 16 from the water 17. The separated oil 16 thus contains a low water fraction, which is relatively small, however, in proportion to the separated oil and is thus negligible.

Furthermore, provision can be made so that at least the channel 13 and/or the mouth area 41 are provided with a cover 38, in order to prevent an influencing of the oil slick by the wind. The cover can extend also over another area of the inlet 11. Furthermore, floating bodies 39 can also be provided, which are connected in a wind-tight manner with the cover 38 and float on the oil slick without being substantially submerged. These floating bodies 39 can be affixed to the cover via expansion bellows 40. This will prevent the wind from blowing into the channel and causing a churning up of the oil slick. The oil slick arrives at the separating site calm, and the oil can be optimally drawn off. Independent floating bodies 44 can also be provided which float on the oil slick and thus calm the oil slick and its surface.

The device, in accordance with the invention, can have a span of 50–100 m in the front inlet area 11 for an effective mode of operation. The length of the device can thus also be between 50 and 100 m. It is obvious that such a device can hardly be moved rapidly on the high seas. Provision is therefore made so that as can be seen, in particular, in FIG. 1, the individual floating bodies 10, 12 are united with one another in a detachable manner. The dimensions of these floating bodies are set in such a manner that they fit into Euro containers without any problems in order to be able to bring them to the desired site of the accident. On site, the floating bodies 12 can quickly be joined to one another and braced by the cable 15, so that the effective device can be ready. The only thing subsequently still needed is to transport away the separated oil. This can be done by corresponding smaller and/or more rapid transport ships, which shuttle between the site of the accident and a disposal site, for example, a larger tank ship and/or the coast.

As a rule, the device will be oriented against the wind, which drives the oil slick in the direction of the channel. By constricting the width of the inlet, an increase of the thickness of the oil slick takes place, so that a separation of the oil slick is very possible. To improve the flow of the oil slick in the direction of the channel, wind guiding elements 54 can be provided, at least in the front, widest area of the inlet 11, in order to deflect the wind in the direction of the middle. The wind guiding elements are shown with a broken line in FIG. 1. In this way, the inflow behavior of the oil slick into the channel can be improved. The height of the wind guiding elements is preferably to be dimensioned in such a manner that the submerging of the wind guiding elements is avoided.

Figure 11:
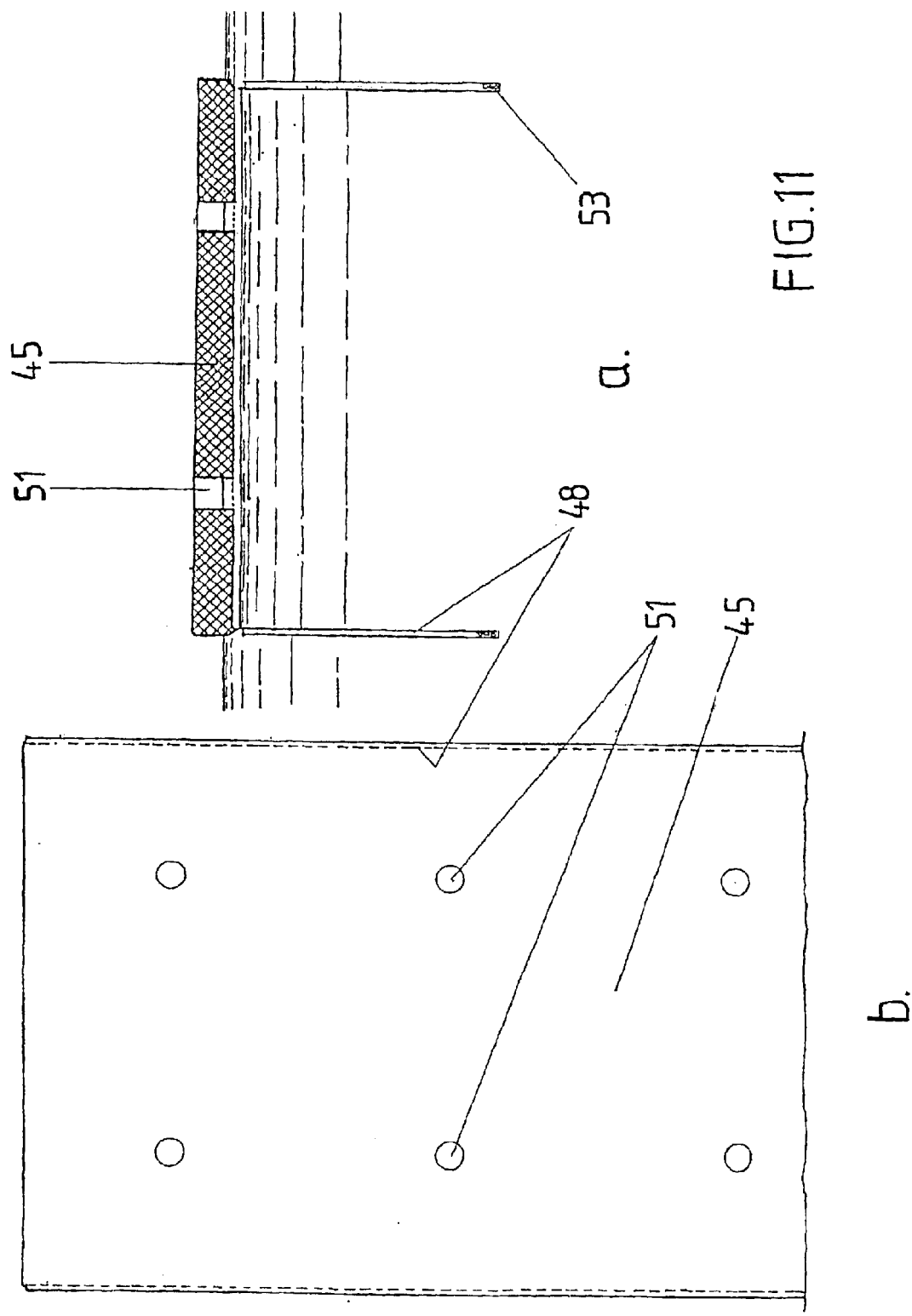
FIG. 11a, b, a floating element of the formation of the inlet in a front view and in top view.
Figure 12:
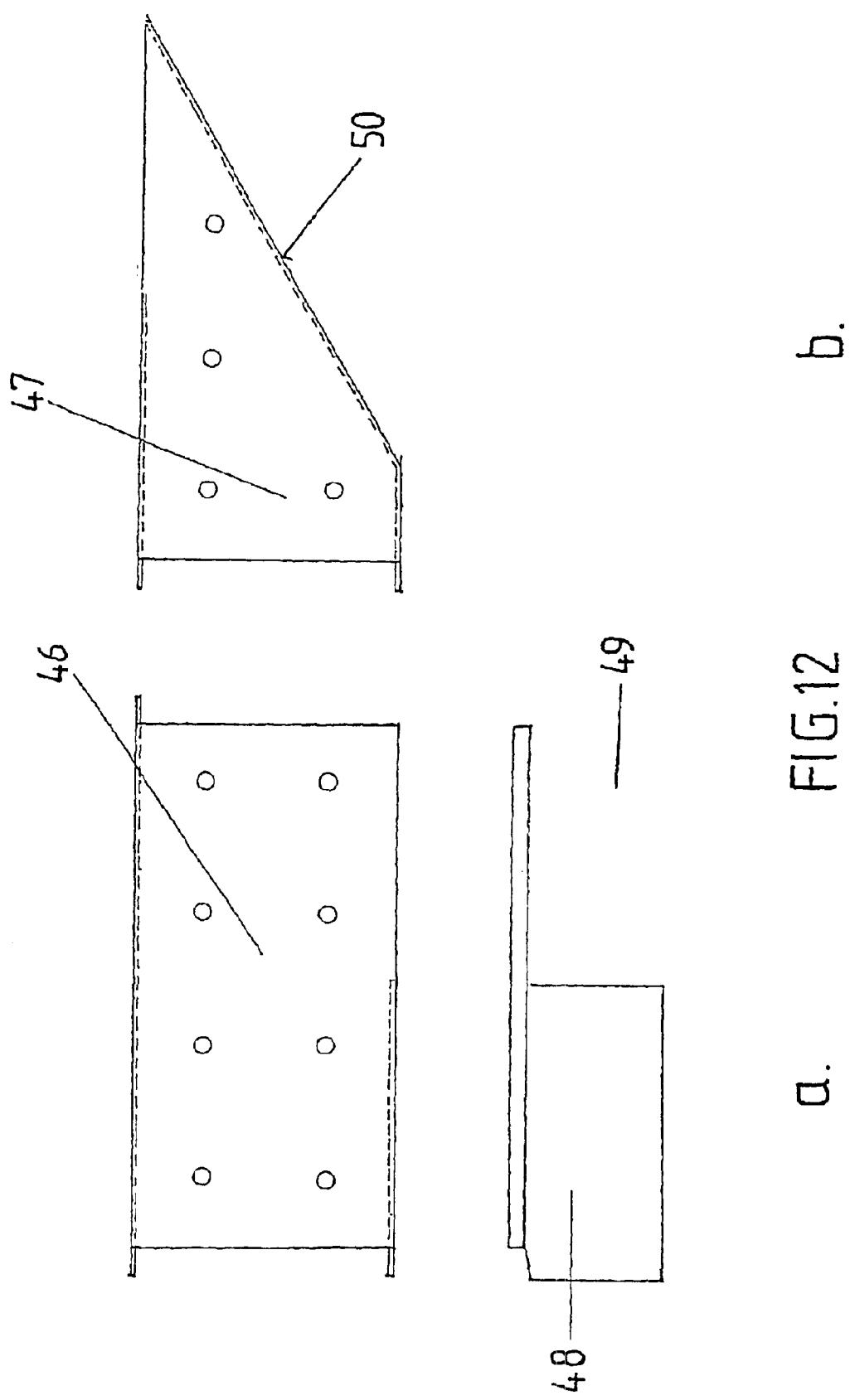
FIG. 12a, b, the top view of floating elements in various embodiments.
Figure 13:
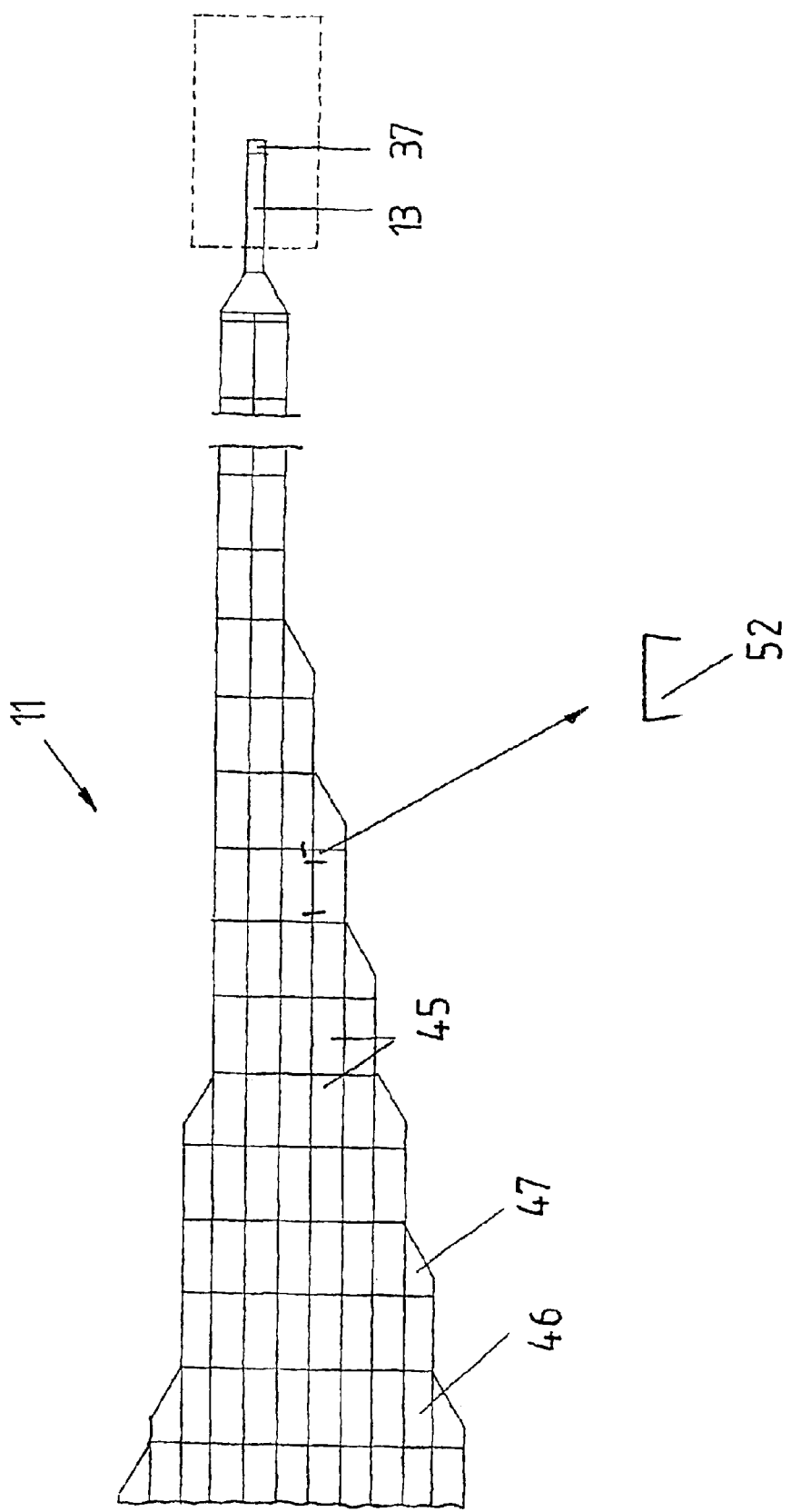
FIG. 13, the top view of an inlet formed by the floating elements according to FIGS. 11 and 12.

FIGS. 11–13 show another embodiment for the formation of the inlet 11 of the device. Individual floating elements 45, 46, 47 are provided which have lateral walls 48 which point downward and which extend relatively far below the separating layer 18. Thus, a gap is formed by each floating element, which is delimited by the walls 48. If several such floating elements are put together in the sense of FIG. 13, an inlet is formed which tapers in stages to the channel 13 with the dropping gradient 37.

FIGS. 12a, b show connecting elements 46 and border elements 47 whose walls have notches 49 or an inclined course 50, in order to make possible the tapering structure. The floating elements 45, 46, 47 can be joined with one another in any arbitrary manner, preferably in a movable manner. In the exemplified embodiment shown, openings or indentations 51 are provided on the upper side of the floating elements, into which C-shaped claws 52 mesh in the assembled state and thus bring about a vertically movable, but horizontally firm composite. The individual floating elements can be dimensioned in such a way that transporting in a container or a freight vehicle is readily possible. Provision can also be made so that the walls 48 are held at the floating element 45, 46, 47 in a foldable manner and by means of weights 53, always point downwards in the floating state. This embodiment is suitable, in particular, for use in flowing and rapidly flowing bodies of water.

What is claimed is:

1. A device for recovering the oil of an oil slick on a body of water, comprising:
    at least one first floating body (10) defining an inlet (11), open on one side in the direction of the oil slick and discharging into a channel (13) with opposed upstanding sidewalls (36) on the other side,
    a separating body (19) located within said channel and extending from one sidewall to the other sidewall transversely across the channel, said separating body being of a specific weight lighter than water and heavier than oil so that it is oriented spontaneously to a level of a separating layer (18) of the oil slick between the water (17) and the oil (16),
    an upper drain zone located within said channel above the separating body, and
    a separate lower drain zone located within said channel below the separating body (19, 33),
    said separating body having a front separating edge (20) facing the oil slick essentially at a level of the separating layer (18) between the water (17) and the oil (16) so that the oil within the channel is directed over said separating body into the upper drain zone.

2. A device according to claim 1, further comprising a second floating body (35) located within said channel upstream of said separating body and having a specific weight lighter than water and heavier than oil, whereby a position of the second floating body provides information useful to monitor, correct or adjust a position of the separating body (33) in the channel relative to the separating layer (18) of the oil slick.

3. A device according to claim 2, wherein said second floating body (35) and said separating body (33) have substantially the same specific weight.

4. A device according to claim 1, wherein said separating body (19,33) is formed as a substantially flat plate that extends substantially horizontal between said sidewalls (36) of said channel (13).

5. A device according to claim 4, wherein said opposed sidewalls of said channel (13) are supported on the water by at least a third floating body (30) moveable relative to the first floating body (10).

6. A device according to claim 4, wherein said upper drain zone connects to an immersing shaft (23) having an upper edge connected with the separating body (19,33) such that a dropping gradient (37) is formed therebetween enabling removal of oil from said upper drain zone.

7. A device according to claim 6, wherein said separating body (19) is connected with said shaft (23) via an elastic element (31) forming said dropping gradient.

8. Device according to claim 7, wherein a pump (25) is provided which pumps off the oil flowing into the shaft (23).

9. A device according to claim 7, wherein the device is provided with at least one drive.

10. A device according to claim 7, further comprising wind guide elements (54) adjacent said inlet.

11. A device according to claim 4, wherein said separating body (19) is movable up and down, vertically, relative to the sidewalls (36) of the channel in a connecting link guide (32).

12. A device according to claim 4, wherein said separating body (19,33) is supported against the flow of the oil-slick and water.

13. A device according to claim 4, wherein said front separating edge (20) of said supporting body (19,33) facing the oil slick is positionable such that it runs slightly below the separating layer (18) between the oil and the water.

14. A device according claim 4, wherein said lower drain zone of said channel is open and discharges into the open sea, behind the device.

15. A device according to claim 4, wherein said inlet is formed from boundary floating bodies (12) that are maintained by a cable bracing (15) in an opened position and that are movable with respect to one another.

16. A device according to claim 4, wherein said inlet is formed from a large number of floating elements (45,46,47) which have lateral boundary walls (48) that point downward and that depend vertically to below said separating layer (18), and said floating elements are engaged together in such a manner that a laterally limited inlet in the direction of the channel is formed.

17. Device according to claim 16, wherein the boundary walls (48) swivel at the floating elements (45,46,47).

18. A device according to claim 16, wherein said boundary walls (48) have free lower ends with weights (53).

19. A device according to claim 1, wherein the specific weight of said separating body (19,33) is between 850 and 950 kg/m$^3$.

20. A device according to claim 1, wherein said first floating body (10) supports the device such that the device is adapted to follow a large swell in the water.

21. A device according to claim 1, wherein at least said channel has at least one cover (38), closing said channel from above.

22. A device according to claim 21, further comprising fourth floating bodies (39) that float on the oil slick and that are connected, in a wind-tight manner, with said cover (38) and that close at least one part of said inlet of said channel above the oil slick.

23. Device according to claim 22, wherein the fourth floating bodies (39) are connected elastically with the cover via at least one expansion bellows (40).

* * * * *